No. 767,595. PATENTED AUG. 16, 1904.
C. B. PIKE.
COFFEE POT PERCOLATING AND CIRCULATING ATTACHMENT.
APPLICATION FILED APR. 27, 1904.
NO MODEL.
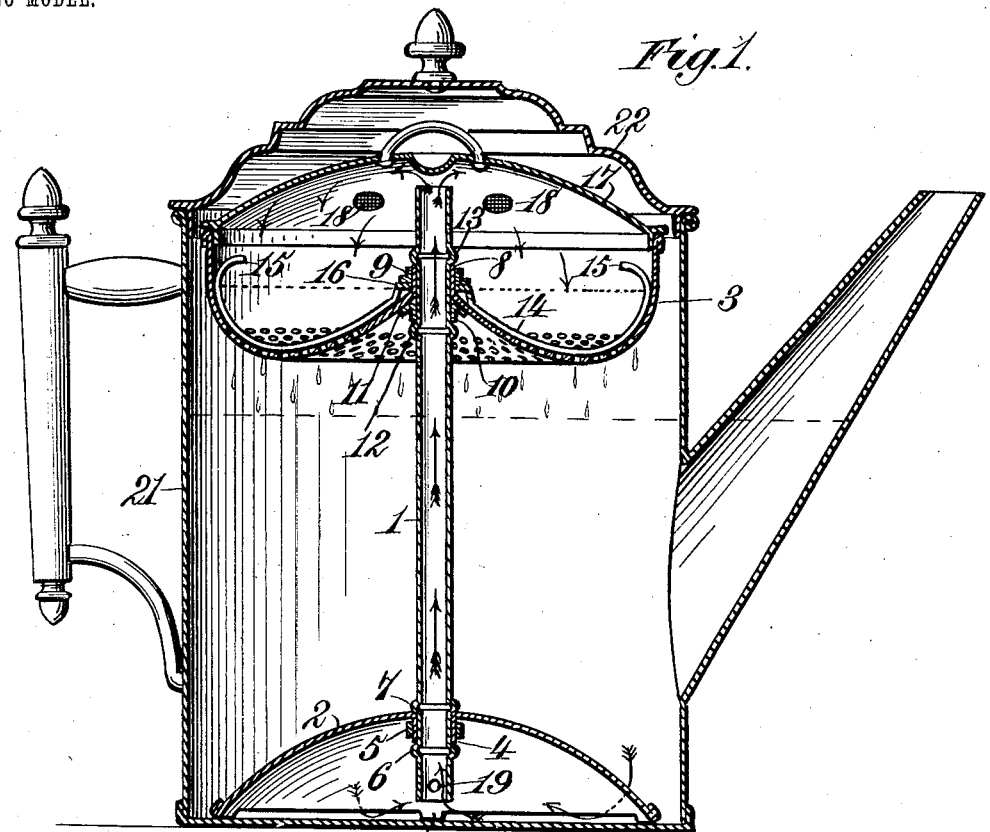
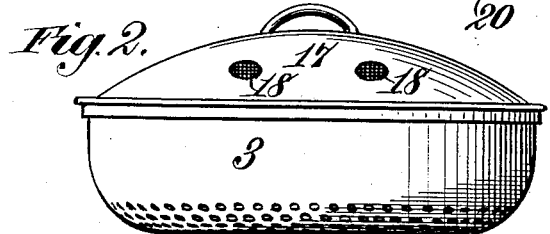
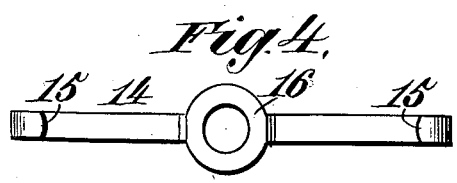
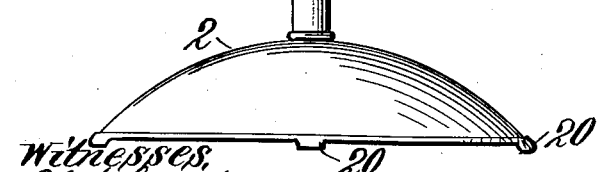

No. 767,595.

Patented August 16, 1904.

UNITED STATES PATENT OFFICE.

CLINTON B. PIKE, OF BIRMINGHAM, ALABAMA, ASSIGNOR OF ONE-HALF TO WILLIAM M. WADLEY, OF BIRMINGHAM, ALABAMA.

COFFEE-POT PERCOLATING AND CIRCULATING ATTACHMENT.

SPECIFICATION forming part of Letters Patent No. 767,595, dated August 16, 1904.

Application filed April 27, 1904. Serial No. 205,222. (No model.)

*To all whom it may concern:*

Be it known that I, CLINTON B. PIKE, a citizen of the United States, residing at Birmingham, in the county of Jefferson and State of Alabama, have invented certain new and useful Improvements in Coffee-Pot Percolating and Circulating Attachments; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to coffee-pots, and has for its object to provide a device designed to be placed inside of the coffee-pot, so as to effect the circulation of the menstruum or liquid from the bottom to the top of the pot, so that it may discharge onto the coffee held in a basket at the top and percolate through the body of the coffee, so as to extract the essence of the coffee, which percolate then passes to the bottom of the coffee-pot and again to the top, and so on, until the coffee is of the desired strength.

To the accomplishment of the several objects hereinafter made to appear the invention consists in features of construction and combination of parts hereinafter particularly described and then sought to be clearly defined by the claims, reference being had to the accompanying drawings, forming a part hereof, and in which—

Figure 1 is a vertical section through a coffee-pot with my device applied. Fig. 2 is a view of the device separate from the coffee-pot. Fig. 3 is a side view of the scraper, and Fig. 4 is a plan view of the same.

In the drawings, the numeral 1 designates an upright tube which is provided at its lower portion with an inverted cup or dish shaped portion 2, which for convenience I will designate as a "vapor-receiver," and the tube at its upper portion is provided with a cup-shaped receptacle 3, which for convenience I will designate as a "basket," which is perforated or reticulated, so as to permit the menstruum or liquid to pass through the same into the coffee-pot.

The dome-shaped vapor-receiver 2 has a depending flange 4 around the central opening through which the tube 1 passes, and around this flange is forced a collar 5, so as to bind the receiver to the tube 1 and also to strengthen the connection between the tube and the receiver. After the receiver and its clamping-collar are applied to the tube beads 6 and 7 are pressed up from the tube, one below the flange 4 and the other at the top of the flange, so as to aid in securely fastening together the tube and the vapor-receiver.

The basket 3 at the central opening through which the tube 1 passes is formed with an annular flange 8, which fits around the tube, and around this flange on the inside of the basket is placed a collar 9, so as to clamp the basket to the tube. Beneath the basket and encircling the tube is another sleeve or collar, 10, which has a downwardly-deflected lip 11 at its upper end which bears against the under side of the basket and which being pressed up into place acts, in conjunction with the collar 9, to securely clamp into position the basket to the tube. The tube 1 beneath the collar 10 is formed with an outwardly-pressed bead 12 and above the flange 8 of the basket is formed with an outwardly-pressed bead 13, which two beads will prevent any possible sliding of the basket on the tube.

Within the basket 3 is a scraper 14, which is formed of a strip of metal conforming to the contour of the basket and which has inwardly-turned ends 15, which serve as handles by means of which the scraper can be rotated within the basket for the purpose of loosening the coffee particles contained in the basket and prevent the same from caking on the bottom and walls of the basket. This scraper is provided with a central annular ring 16, which encircles the central upwardly-extending flange 8 of the basket and lies under the collar 9, so that the scraper is held in position in contact with the inside face of the basket and prevented from sliding lengthwise of the tube 1 and yet free to be turned or rotated within the basket for the purpose stated.

The basket 3 is provided with a removable cap 17, held by friction or otherwise to the basket, which cap is provided with screen-covered vents 18 for the passage of vapor or steam from the top of the basket into the coffee-pot. It will be observed that the upper portion of the tube 1 extends above the top of the wall of the basket and terminates above the screen vents 18, and by terminating above the screen vents 18 any possibility of the menstruum and coffee-grounds in the basket rising to the top of the tube and passing down into the same is avoided. It will also be observed that the lower end of the tube 1 extends to within a short distance of the lower edge of the vapor-receiver 2, so that even though there be a comparatively small quantity of the menstruum in the coffee-pot the same will, under the boiling action of the heat, be forced up through the tube 1 and discharged from the top of the tube onto the ground coffee contained within the basket and thence by percolation through the coffee pass down through the bottom of the basket into the coffee-pot, and thus the circulation of the menstruum within the coffee-pot is maintained, so that the essence of the coffee is thoroughly extracted. It will also be observed that the tube 1, near its lower end within the vapor-receiver 2, is provided with a lateral orifice 19, which will cause a freer circulation of the menstruum in the vapor-receiver than otherwise would be the case. The lower edge of the receiver 2 is formed with any desired number of downwardly-extending projections 20, which when the receiver is resting upon the bottom of the coffee-pot will leave a space between the receiver and bottom of the pot for the passage of the menstruum from the coffee-pot into the space under the dome-shaped vapor-receiver in order that a circulation from the pot into the vapor-receiver and up through the central tube into the basket and back into the pot may be maintained. The outside dimensions of the basket and vapor-receiver will be somewhat less than the inside diameter of the coffee-pot, so that if additional menstruum or liquid is to be added it can be introduced at the top of the pot and readily pass into the body of the pot.

The coffee-pot 21 may be of any approved pattern and, as usual, will be provided with a removable cover 22.

My device can be made out of light metal stamped or pressed into shape, and when its several parts are assembled it will be strong and durable and at the same time light in weight, so that it may be with entire ease inserted and withdrawn from the coffee-pot as occasion requires.

I have illustrated and described with particularity the preferred details of construction and arrangement of the several parts; but it is to be understood that changes can be made and essential features of my invention be retained.

Having described my invention and set forth its merits, what I claim is—

1. The coffee-pot percolating and circulating attachment comprising the central tube, the dome-shaped vapor-receiver secured to the lower portion of the tube, with the end of the tube terminating near the lower edge of the dome, the perforated basket supported from the upper portion of the tube, and the cap to the basket provided with vent-openings, the upper end of the tube terminating above said vent-openings, substantially as described.

2. The coffee-pot percolating and circulating attachment comprising the central tube, the dome-shaped vapor-receiver secured to the lower portion of the tube, with the end of the tube terminating near the lower edge of the dome and provided with a lateral orifice, the basket supported from the upper portion of the tube, and the cap to the basket provided with vent-openings, the end of the tube terminating above the vent-openings in the cap, substantially as described.

3. The coffee-pot percolating and circulating attachment comprising the central tube, the basket supported from the upper portion of the tube, the dome-shaped vapor-receiver having a central opening provided with a depending annular flange to fit around the tube, and beads formed on the tube, one bead below and the other above the depending flange of the dome, substantially as described.

4. The coffee-pot percolating and circulating attachment comprising the central tube, the dome-shaped vapor-receiver secured to the lower portion of the tube, with the end of the tube terminating near the lower edge of the dome, the perforated basket supported from the upper portion of the tube and provided with an annular flange to encircle the tube, a collar fitting around said flange, and a collar encircling the tube beneath the basket and having a downwardly-deflecting lip bearing against the bottom of the basket, substantially as described.

5. The coffee-pot percolating and circulating attachment comprising the central tube, the dome-shaped vapor-receiver secured to the lower portion of the tube, the basket supported from the upper portion of the tube and provided with an annular flange encircling the tube, a collar around the flange, a collar around the tube beneath the basket, and beads formed on the tube, one of them at the edge of the flange to the basket and the other next to the collar encircling the tube, substantially as described.

6. The coffee-pot percolating and circulating attachment comprising the central tube, the dome-shaped vapor-receiver secured to the lower portion of the tube, the basket supported from the upper portion of the tube, and the rotary scraper located within the basket and having an annular ring encircling the tube, substantially as described.

7. The coffee-pot percolating and circulating attachment comprising the central tube, the dome-shaped vapor-receiver secured to the lower portion of the tube, the basket supported from the upper portion of the tube and provided with an annular flange encircling the tube, a rotatable scraper located within the basket and having an annular ring encircling the flange of the basket, and a collar around said flange and above the annular ring of the scraper, substantially as described.

In testimony whereof I affix my signature in presence of two witnesses.

CLINTON B. PIKE.

Witnesses:
W. H. THARPE,
G. F. LINDSEY.